United States Patent [19]

Akhavan-Leilabady et al.

[11] Patent Number: 4,956,843
[45] Date of Patent: Sep. 11, 1990

[54] SIMULTANEOUS GENERATION OF LASER RADIATION AT TWO DIFFERENT FREQUENCIES

[75] Inventors: Pedram Akhavan-Leilabady, Woodridge; Douglas W. Anthon, Wheaton, both of Ill.

[73] Assignee: Amoco Corporation, Chicago, Ill.

[21] Appl. No.: 418,856

[22] Filed: Oct. 10, 1989

[51] Int. Cl.⁵ .............................................. H01S 3/10
[52] U.S. Cl. ........................................ 372/23; 372/68; 372/71; 372/75
[58] Field of Search .................. 372/68, 23, 97, 75, 372/92, 41

[56] References Cited

U.S. PATENT DOCUMENTS

| | | | |
|---|---|---|---|
| 3,582,820 | 6/1971 | Snitzer | 372/68 |
| 3,753,147 | 8/1973 | Schulthess | 372/68 |
| 3,975,693 | 8/1976 | Barry et al. | 372/23 |
| 4,173,001 | 10/1979 | Koepf | 372/71 |
| 4,173,738 | 11/1979 | Boling et al. | 372/68 |
| 4,367,552 | 1/1983 | Jacobson | 372/23 |
| 4,499,582 | 2/1985 | Karning et al. | 372/23 |
| 4,510,605 | 4/1985 | George et al. | 372/97 |
| 4,528,671 | 7/1985 | Robbins | 372/68 |
| 4,847,851 | 7/1989 | Dixon | 372/75 |
| 4,860,301 | 8/1989 | Nicholson | 372/68 |

Primary Examiner—Frank Gonzalez
Assistant Examiner—Susan S. Morse
Attorney, Agent, or Firm—Richard A. Kretchmer; Wm. A. Magidson; Ralph C. Medhurst

[57] ABSTRACT

The output of a single semiconductor light source is used to optically pump two solid state lasers which are arranged in series and produce laser radiation at two different frequencies. Single longitudinal and single transverse mode operation can be achieved in both lasers.

28 Claims, 1 Drawing Sheet

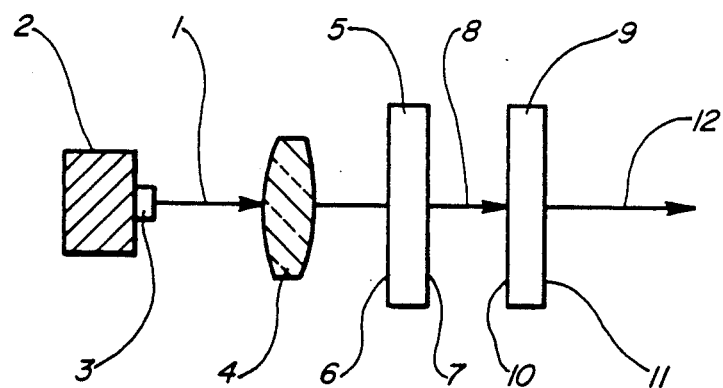

SIMULTANEOUS GENERATION OF LASER RADIATION AT TWO DIFFERENT FREQUENCIES

FIELD OF THE INVENTION

This invention relates to the simultaneous generation of laser radiation at two different frequencies by the simultaneous optical pumping of two solid state lasers with a single semiconductor light source. More particularly, it relates to the transmission of a portion of the pumping radiation through the lasant material of a first laser and the use of this transmitted pumping radiation to optically pump a second laser.

BACKGROUND OF THE INVENTION

A laser is a device which has the ability to produce monochromatic, coherent light through the stimulated emission of photons from atoms, molecules or ions of an active medium which have typically been excited from a ground state to a higher energy level by an input of energy. Such a device contains an optical cavity or resonator which is defined by highly reflecting surfaces which form a closed round trip path for light, and the active medium is contained within the optical cavity.

If a population inversion is created by excitation of the active medium, the spontaneous emission of a photon from an excited atom, molecule or ion undergoing transition to a lower energy state can stimulate the emission of photons of substantially identical energy from other excited atoms, molecules or ions. As a consequence, the initial photon creates a cascade of photons between the reflecting surfaces of the optical cavity which are of substantially identical energy and exactly in phase. A portion of this cascade of photons is then discharged out of the optical cavity, for example, by transmission through one or more of the reflecting surfaces of the cavity. These discharged photons constitute the laser output.

Excitation of the active medium of a laser can be accomplished by a variety of methods. However, the most common methods are optical pumping, use of an electrical discharge, and the passage of an electric current through the p-n junction of a semiconductor laser.

Semiconductor lasers contain a p-n junction which forms a diode, and this junction functions as the active medium of the laser. Such devices, which are also referred to as laser diodes, are typically constructed from materials such as gallium arsenide and aluminum gallium arsenide alloys. The efficiency of such lasers in converting electrical power to output radiation is relatively high and, for example, can be in excess of 40 percent.

The use of flashlamps, light-emitting diodes (as used herein, this term includes superluminescent diodes and superluminescent diode arrays) and laser diodes (as used herein, this term includes laser diode arrays) to optically pump or excite a solid lasant material is well-known. Lasant materials commonly used in such solid state lasers include crystalline or glassy host materials into which an active material, such as trivalent neodymium ions, is incorporated. Highly suitable solid lasant materials include substances wherein the active material is a stoichiometric component of the lasant material. Such stoichiometric materials include, for example, neodymium pentaphosphate, neodymium aluminum borate and lithium neodymium tetraphosphate. Detailed summaries of conventional solid lasant materials are set forth in the CRC Handbook of Laser Science and Technology, Vol. I, M. J. Weber, Ed., CRC Press, Inc., Boca Raton, Florida, 1982, pp. 72–135 and by A. A. Kaminskii in Laser Crystals, Vol. 14 of the Springer Series in Optical Sciences, D. L. MacAdam, Ed., Springer-Verlag, New York, N.Y., 1981. Conventional host materials for neodymium ions include glass, yttrium aluminum garnet ($Y_3Al_5O_{12}$, referred to as YAG), $YAlO_3$ referred to as YALO), $LiYF_4$ (referred to as YLF), gadolinium gallium garnet ($Gd_3Ga_5O_{12}$, referred to as GGG) and gadolinium scandium gallium garnet ($Gd_3Sc_2Ga_3O_{12}$, referred to as GSGG). By way of example, when neodymium-doped YAG is employed as the lasant material in an optically-pumped solid state laser, it can be pumped by absorption of light having a wavelength of about 808 nm and can emit light having a wavelength of 1064 nm.

U.S. Pat. No. 3,624,545, issued to Ross on Nov. 30, 1971, describes an optically-pumped solid state laser composed of a YAG rod which is side-pumped by at least one semiconductor laser diode. Similarly, U.S. Pat. No. 3,753,145, issued to Chesler on Aug. 14, 1973, discloses the use of one or more light-emitting semiconductor diodes to end-pump a neodymium-doped YAG rod. The use of an array of pulsed laser diodes to end-pump a solid lasant material such as neodymium-doped YAG is described in U.S. Pat. No. 3,982,201, which was issued to Rosenkrantz et al. on Sept. 21, 1976. Finally, D. L. Sipes, Appl. Phys. Lett., Vol. 47, No. 2, 1985, pp. 74–75, has reported that the use of a tightly focused semiconductor laser diode array to end pump a neodymium-doped YAG results in a high efficiency conversion of pumping radiation having a wavelength of 810 nm to output radiation having a wavelength of 1064 nm.

U.S. Pat. No. 4,847,851, issued to Dixon on July 11, 1989, discloses a diode-pumped solid state laser wherein the diode pump is butt-coupled to a laser gain material which absorbs 63% of the optical pumping radiation within a pathlength of less than 500 microns. In such a device, a divergent beam of optical pumping radiation from the diode pump is directed into a volume of the gain medium which has a sufficiently small transverse cross-sectional area so as to support only single transverse mode laser operation. In addition, J. J. Zayhowski et al., Optics Letters, Vol. 14, No. 1, pp. 24–26 (Jan. 1, 1989), have reported the construction of single-frequency microchip lasers which: (a) use a miniature, monolithic, flat-flat, solid-state cavity whose mode spacing is greater than the gain bandwidth of the gain medium; and (b) are longitudinally pumped with the close-coupled, unfocused output of a laser diode.

U.S. Pat. No. 4,173,738, issued to Boling et al. on Nov. 6, 1979, is directed to a solid state laser which has an output at two distinct wavelengths. This device is optically-pumped with white light and contains, as its active medium, an array of two different types of solid plate-like elements along a common optical axis. One type of element lases at one wavelength and the other at a second wavelength.

SUMMARY OF THE INVENTION

For certain specialized applications, such as two wavelength holography, and various sensing systems, there is a need for an efficient, compact, simple, highly stable and reliable device which is capable of simultaneously generating laser radiation at two different frequencies. We have found that such a device can be constructed through the use of a single semiconductor light source to optically pump two solid state lasers. More specifically, we have found that a portion of the pumping radiation can be passed through the lasant material of a first laser and used to optically pump a second laser.

One embodiment of the invention is a method for simultaneously generating laser radiation at two different frequencies which comprises: (a) generating optical pumping radiation from a semiconductor light source; (b) generating laser radiation of a first frequency by optically pumping a first optical gain means with said optical pumping radiation within a first optical cavity which is resonant for said radiation of a first frequency, wherein said first optical gain means consists of a solid lasant material; (c) transmitting a portion of said optical pumping radiation through said first optical gain means; and (d) generating laser radiation of a second frequency by optically pumping a second optical gain means with said transmitted portion of the optical pumping radiation within a second optical cavity which is resonant for said radiation of a second frequency, wherein said second optical gain means consists of a solid lasant material.

Another embodiment of the invention is an apparatus for simultaneously generating laser radiation of two different frequencies which comprises: (a) optical pumping means for generating optical pumping radiation, wherein said optical pumping means comprises a semiconductor light source; (b) a first optical cavity for resonating laser radiation of a first frequency; (c) first optical gain means for receiving said optical pumping radiation which is disposed within said first optical cavity, wherein said first optical gain means is effective to transmit a portion of said optical pumping radiation and to absorb a portion of said optical pumping radiation, wherein said first optical gain means is effective to generate laser radiation of said first frequency in response to the absorbed portion of said optical pumping radiation, and wherein said first optical gain means consists of a solid lasant material; (d) a second optical cavity for resonating laser radiation of a second frequency; and (e) second optical gain means for receiving said transmitted portion of the optical pumping radiation which is disposed within said second optical cavity, wherein said second optical gain means is effective to generate laser radiation of said second frequency in response to the transmitted portion of said optical pumping radiation, and wherein said second optical gain means consists of a solid lasant material.

An object of the invention is to provide a diode-pumped solid state device which is capable of simultaneously generating laser radiation at two different frequencies.

Another object of the invention is to provide a method and apparatus for simultaneously generating laser radiation at two different frequencies wherein each of said two different frequencies is a stable single frequency.

Another object of the invention is to provide a method and apparatus for simultaneously generating laser radiation at two different frequencies with TEM$_{oo}$ beam quality for radiation of each frequency.

A further object of the invention is to provide a method and apparatus for simultaneously generating laser radiation at wavelengths of 1064 and 1319 nm.

A still further object of the invention is to utilize a single semiconductor light source to optically pump two solid state lasers which are arranged in series.

BRIEF DESCRIPTION OF THE DRAWING

The drawing is a schematic representation of one embodiment of the invention.

DETAILED DESCRIPTION OF THE PREFERRED EMBODIMENT

While this invention is susceptible of embodiment in many forms, there is schematically shown in the drawing a preferred embodiment with the understanding that the present disclosure is not intended to limit the invention to the embodiment illustrated.

With reference to the drawing, optical pumping radiation 1 from optical pumping means (2 and 3) is focused by focusing means 4 into solid lasant material 5 which is capable of being pumped by the optical pumping radiation 1. Radiation of a first frequency emitted by the lasing of lasant material 5 oscillates within a first linear standing wave optical cavity which is defined by reflective coatings on input surface 6 and output surface 7 of lasant material 5. A portion of the optical pumping radiation 1 passes through lasant material 5 and the coatings on surfaces 6 and 7 of lasant material 5, and such transmitted light is hereinafter referred to as "transmitted pumping radiation." In addition, a portion of the light emitted by the lasing of lasant material 5 is passed through the reflective coating on output surface 7, and such light is hereinafter referred to as "first laser output radiation." The combination 8 of transmitted pumping radiation and first laser output radiation is directed into solid lasant material 9 which is capable of being pumped by the transmitted pumping radiation. Radiation of a second frequency emitted by the lasing of lasant material 9 oscillates within a second linear standing wave optical cavity which is defined by reflective coatings on input surface 10 and output surface 11 of lasant material 9. First laser output radiation is passed through lasant material 9 and the coatings on surfaces 10 and 11. A portion of the light emitted by the lasing of lasant material 9 is passed through the reflective coating on output surface 11, and such light is hereinafter referred to as "second laser output radiation." The resulting output radiation 12 is a combination of the first and second laser output radiation.

Laser radiation produced by a lasant material in an optical cavity can be either single longitudinal mode in character or it can be comprised of two or more longitudinal modes of substantially the same frequency or wavelength. Unless the longitudinal mode structure is expressly specified, reference herein to laser radiation as having a specific frequency will be understood to include all of the longitudinal modes of substantially the same frequency which are generated by the lasant material and supported within the optical cavity.

Optical pumping means (2 and 3) comprises a semiconductor light source selected from the group consisting of laser diodes, laser diode arrays, superluminescent diodes and superluminescent diode arrays, and light from such a source is substantially monochromatic. However, preferred sources of pumping radiation 1 include laser diodes and laser diode arrays. Such diodes are commonly attached to a thermally conductive heat sink and are packaged in a protective housing. For efficient operation, the wavelength of optical pumping radiation 1 is matched with a suitable absorption band of the lasant materials 5 and 9. Conventional light-emitting diodes and laser diodes are available which, as a function of composition, produce output radiation having a wavelength over the range from about 630 nm to about 1600 nm, and any such device producing optical pumping radiation 1 of a wavelength effective to pump lasant materials 5 and 9 can be used in the practice of this invention. For example, the wavelength of the output radiation from a GaInP based device can be varied from about 630 to about 700 nm by variation of the device composition. Similarly, the wavelength of the output radiation from a GaAlAs based device can be varied from about 750 to about 900 nm by variation of the device composition, and InGaAsP based devices can be used to provide radiation in the wavelength range from about 1000 to about 1600 nm.

A highly suitable source of optical pumping radiation 1 consists of a gallium aluminum arsenide laser diode array 3, emitting light having a wavelength of about 810 nm, which is attached to heat sink 2. Heat sink 2 can be passive in character. However, heat sink 2 can also comprise a thermoelectric cooler to help maintain laser diode array 3 at a constant temperature and thereby ensure optimal operation of laser diode array 3 at a constant wavelength. It will be appreciated, of course, that during operation the optical pumping means will be attached to a suitable power supply. Electrical leads from laser diode array 3 which are directed to a power supply are not illustrated in the drawing.

Focusing means 4 serves to focus pumping radiation 1 into lasant materials 5 and 9. This focusing results in a high pumping intensity and an associated high photon to photon conversion efficiency in lasant materials 5 and 9. Focusing means 4 can comprise any conventional means for focusing light, such as a gradient index lens, a ball lens, an aspheric lens or a combination of lenses. Although the use of focusing means 4 is highly preferred, it will be appreciated that focusing means 4 is not an essential element of the invention.

If desired, the output facet of semiconductor light source 3 can be placed in butt-coupled relationship to input surface 6 of lasant material 5 without the use of focusing means 4. As used herein, "butt-coupled" is defined to mean a coupling which is sufficiently close such that a divergent beam of optical pumping radiation 1 emanating from semiconductor light source 3 will optically pump a mode volume within the lasant material with a sufficiently small transverse cross-sectional area so as to support essentially only single transverse mode laser operation ($TEM_{oo}$ mode operation) in lasant material 5. Similarly, input surface 10 of lasant material 9 can also be placed substantially in contact with output surface 7 of lasant material 5, whereby single transverse mode laser operation ($TEM_{oo}$ mode operation) can also be effected in lasant material 9 if lasant material 5 is sufficiently thin.

The optical cavity which is defined by the reflective coatings on surfaces 6 and 7 of lasant material 5, has a longitudinal optical path passing through lasant material 5 and along which radiation from the lasing of lasant material 5 oscillates. In a highly preferred embodiment of the invention, optical pumping radiation 1 is delivered to lasant material 5 substantially along this longitudinal optical path. If desired, this longitudinal optical path can easily be made short enough to effect essentially single longitudinal mode generation of radiation within the optical cavity. That is to say, the optical cavity can be made sufficiently short so that the cavity-mode spacing is greater than the gain bandwidth of the lasant material and only one cavity mode will operate. For example, this can be accomplished by utilizing a lasant material 5 which has a longitudinal optical path between the reflective coatings on surfaces 6 and 7 that is less than about 2 millimeters. A path length in the range from about 0.1 to about 2 millimeters is generally quite satisfactory.

Similarly, the optical cavity which is defined by the reflective coatings on surfaces 10 and 11 of lasant material 9, has a longitudinal optical path passing through lasant material 9 along which radiation from the lasing of lasant material 9 oscillates. In a highly preferred embodiment of the invention, optical pumping radiation transmitted through lasant material 5 is delivered to lasant material 9 substantially along this longitudinal optical path. If desired, this longitudinal optical path can be made short enough to effect essentially single longitudinal mode generation of radiation within the optical cavity. That is to say, the optical cavity can be made sufficiently short so that the cavity-mode spacing is greater than the gain bandwidth of the lasant material and only one cavity mode will operate. For example, this can be accomplished by utilizing a lasant material 9 which has a longitudinal optical path between the reflective coatings on surfaces 10 and 11 that is less than about 2 millimeters. A path length in the range from about 0.1 to about 2 millimeters is generally quite satisfactory.

As shown in the drawing, the longitudinal optical path of the optical cavity defined by the coatings on surfaces 6 and 7 is substantially colinear with the longitudinal optical path of the optical cavity defined by the reflective coatings on surfaces 10 and 11. Although this is a particularly preferred configuration, it will be appreciated that such a configuration is not essential to the practice of this invention.

In a preferred embodiment of the invention, optical pumping radiation 1 is delivered into a volume of lasant material 5 that has a sufficiently small transverse cross-sectional area so as to support essentially only single transverse mode laser operation ($TEM_{oo}$ mode operation) in the optical cavity defined by the reflective coatings on surfaces 6 and 7 of lasant material 5. This can be effected, for example, through focusing means 4 or by butt-coupling the output facet of semiconductor light source 3 to input surface 6 of lasant material 5.

In another preferred embodiment of the invention, optical pumping radiation which is transmitted through lasant material 5, is delivered into a volume of lasant material 9 that has a sufficiently small transverse cross-sectional area so as to support essentially only single transverse mode laser operation ($TEM_{oo}$ mode operation) in the optical cavity which is defined by the reflective coatings on surfaces 10 and 11 of lasant material 9. This can be effected, for example, with focusing means 4, with a separate focusing means positioned between lasant material 5 and lasant material 9, or by butt-coupling the output facet of semiconductor light source 3 to input surface 6 of lasant material 5 and placing input surface 10 of lasant material 9 substantially in contact with output surface 7 of lasant material 5.

Any conventional lasant material can be used as lasant material 5 and lasant material 9 provided that it is capable of being optically pumped by the optical pumping means selected. Suitable lasant materials include, but are not limited to, solids selected from the group consisting of glassy and crystalline host materials which are doped with an active material and substances wherein the active material is a stoichiometric component of the lasant material. Highly suitable active material include, but are not limited to, ions of chromium, titanium and the rare earth metals. Highly suitable lasant materials include neodymium-doped YAG, neodymium-doped YALO, neodymium-doped YLF, neodymium-doped GGG, neodymium-doped GSGG, neodymium pentaphosphate, neodymium aluminum borate and lithium neodymium tetraphosphate. By way of specific example, neodymium-doped YAG is a highly suitable lasant material for use in combination with an optical pumping means which produces light having a wavelength of about 810 nm. When pumped with light of this wavelength, neodymium-doped YAG can emit light having a wavelength of either about 1064 nm or about 1319 nm.

Although any conventional solid lasant material can be used as lasant material 5, the thickness or longitudinal path length must be adjusted so that enough pumping radiation 1 is transmitted through lasant material 5 to effect the desired optical pumping of lasant material 9. For example, if a stoichiometric material such as lithium neodymium tetraphosphate is used, the longitudinal path length will be quite short because of the high concentration of neodymium. Alternatively, if neodymium-doped YAG which contains about 1% neodymium is used as the lasant material, a longer longitudinal path length will be appropriate because of the lower neodymium concentration.

It will be appreciated that although any conventional solid lasant can be used as lasant material 9, both lasant material 5 and lasant material 9 must be capable of being optically pumped by optical pumping radiation 1. In a preferred embodiment of the invention, lasant materials 5 and 9 are the same material with lasing in material 5 occurring at one laser transition and lasing in material 9 occurring at another laser transition. One such embodiment involves the use of neodymium-doped YAG for both lasant material 5 and lasant material 9 with lasing in one optical cavity taking place at a wavelength of about 1064 nm while lasing in the other optical cavity takes place at a wavelength of about 1319 nm.

The reflective coating on surface 6 of lasant material 5 is selected so that it is substantially transparent to optical pumping radiation 1 but highly reflective for radiation of a first frequency generated by the lasing of lasant material 5 in the optical cavity defined by the reflective coatings on surfaces 6 and 7. The reflective coating on surface 7 is selected so that it is substantially transparent to optical pumping radiation 1 and partially reflective for said radiation of a first frequency generated by the lasing of lasant material 5.

The reflective coating on surface 10 of lasant material 9 is selected so that it is: (a) substantially transparent to optical pumping radiation 1; (b) substantially transparent to radiation of a first frequency produced by the lasing of lasant material 5; and (c) highly reflective for radiation of a second frequency generated by the lasing of lasant material 9 in the optical cavity defined by the reflective coatings on surfaces 10 and 11. The reflective coating on surface 11 is selected so that it is substantially transparent to radiation of a first frequency produced by the lasing of lasant material 5 and partially reflective for said radiation of a second frequency generated by the lasing of lasant material 9.

In a specific example of the embodiment illustrated in the drawing, neodymium-doped YAG having a neodymium concentration of about 1% was used as lasant material 5 and lasant material 9. A multistripe laser diode array 3 attached to a thermoelectric cooler 2 was used as the source of optical pumping radiation 1. The laser diode array 3 (obtained from Spectra Diode Laboratories of San Jose, California) produced about 500 mW of continuous-wave optical pumping radiation which was centered at a wavelength of 808 nm. This pumping radiation was focused by a 0.29 pitch Selfoc gradient index lens which served as focusing means 4. The focused optical pumping radiation was directed into lasant material 5 which was in the form of a disc having a 0.75 mm thickness and a 10 mm diameter. The two planar surfaces 6 and 7 were parallel within 2 arc seconds. Lasant material 5 was coated for emission of light having a wavelength of 1319 nm. More specifically, surface 6 was coated for high transmission at a wavelength of 808 nm and for high reflectivity at a wavelength of 1319 nm. Surface 7 was coated for high transmission at a wavelength of 808 nm and for 1% transmission at a wavelength of 1319 nm. Lasant material 9 was in the form of a disc having a 1.00 mm thickness and a 10 mm diameter. The planar surfaces 10 and 11 were parallel to within 2 arc seconds. Lasant material 9 was coated for emission of light having a wavelength of 1064 nm. More specifically, surface 10 was coated for high transmission at a wavelength of 808 nm and for high reflectivity at a wavelength of 1064 nm. Surface 11 was coated for 2% transmission at a wavelength of 1064 nm. In addition, the coatings on surfaces 10 and 11 were highly transmitting at a wavelength of 1319 nm. Lasant materials 5 and 9 were placed in contact with each other at surfaces 7 and 10. In response to pumping radiation 1, lasant materials 5 and 9 lased simultaneously with substantially equal amounts of output radiation 12 being discharged at wavelengths of 1319 and 1064 nm with an overall optical-optical conversion efficiency of about 22%.

In the above-described specific example, simultaneous single longitudinal mode operation at wavelengths of 1064.2 and 1318.7 nm was confirmed using confocal Fabry-Perot and Ando optical spectrometers. Laser linewidth measurements indicated a linewidth of <24 kHz at both output frequencies. Better than 1% power stability over 16 hr was observed for each output frequency. The polarization of output radiation at each frequency was found to be elliptical with ellipticities of 4.1/1 and 1.8/1 for the 1064.2 and 1318.7 nm wavelength lines respectively. The mode profile analysis of each output line individually as well as the combined total output 12 indicated good spatial superpositioning of the two modes with a Gaussian correlation factor of 97% in mutually orthogonal axes.

The method and apparatus of this invention can be used in a variety of sensor systems. For example, methane gas has an absorption band for radiation having a wavelength of 1331 nm but does not appreciably absorb radiation which has a wavelength of 1064 nm. With reference to the drawing, a device which simultaneously produces laser output radiation at wavelengths of 1064 and 1331 nm can be constructed by using neodymium-doped GGG as lasant material 5 to produce radiation having a wavelength of 1331 nm and neodymium-doped YAG as lasant material 9 to produce radiation having a wavelength of 1064 nm. Accordingly, such a device can be used in a system for the analysis of methane wherein the presence of methane is detected and quantified by measuring the absorption of the 1331 nm radiation by methane through use of the 1064 nm radiation as a reference signal.

We claim:

1. A method for simultaneously generating laser radiation at two different frequencies which comprises:
   (a) generating optical pumping radiation from a semiconductor light source;
   (b) generating laser radiation of a first frequency by optically pumping a first optical gain means with said optical pumping radiation within a first optical cavity which is resonant for said radiation of a first frequency, wherein said first optical gain means consists of a solid lasant material;
   (c) transmitting a portion of said optical pumping radiation through said first optical gain means; and
   (d) generating laser radiation of a second frequency by optically pumping a second optical gain means with said transmitted portion of the optical pumping radiation within a second optical cavity which is resonant for said radiation of a second frequency, wherein said second optical gain means consists of a solid lasant material.

2. The method of claim 1 wherein said first optical cavity has a longitudinal optical path passing through said first optical gain means and along which said radiation of a first frequency is propagated, and wherein said optical pumping radiation is delivered to said first optical gain means substantially along said longitudinal optical path of the first optical cavity.

3. The method of claim 2 which additionally comprises directing said optical pumping radiation into a volume of said first optical gain means which has a transverse cross-sectional area sufficiently small to effect essentially single transverse mode generation of said radiation of a first frequency within said first optical cavity.

4. The method of claim 3 wherein said longitudinal optical path of the first optical cavity is sufficiently short to effect essentially single longitudinal mode generation of said radiation of a first frequency within said first optical cavity.

5. The method of claim 4 wherein the longitudinal optical path of said first optical cavity has a length in the range from about 0.1 to about 2 millimeters.

6. The method of claim 3 which comprises focusing said optical pumping radiation into said first optical gain means with focusing means.

7. The method of claim 3 which comprises butt-coupling the semiconductor light source to said first optical gain means.

8. The method of claim 2 wherein said second optical cavity has a longitudinal optical path passing through said second optical gain means and along which said radiation of a second frequency is propagated, and wherein said transmitted portion of the optical pumping radiation is delivered to said second optical gain means substantially along the longitudinal optical path of said second optical cavity.

9. The method of claim 8 which additionally comprises directing said transmitted portion of the optical pumping radiation into a volume of said second optical gain means which has a transverse cross-sectional area sufficiently small to effect essentially single transverse mode generation of said radiation of a second-frequency within said second optical cavity.

10. The method of claim 9 wherein said longitudinal optical path of the second optical cavity is sufficiently short to effect essentially single longitudinal mode generation of said radiation of a second-frequency within said second optical cavity.

11. The method of claim 10 wherein the longitudinal optical path of said second optical cavity has a length in the range from about 0.1 to about 2 millimeters.

12. The method of claim 9 which additionally comprises delivering said optical pumping radiation to said first optical gain means within a volume that is sufficiently small to effect essentially single transverse mode generation of said radiation of a first-frequency within said first optical cavity.

13. The method of claim 12 which comprises delivering said transmitted portion of the optical pumping radiation to said second optical gain means by butt-coupling said first optical gain means to said second optical gain means.

14. The method of claim 12 wherein the longitudinal optical path of the first optical cavity sufficiently short to effect essentially single longitudinal mode generation of said radiation of a first-frequency and wherein the longitudinal optical path of the second optical cavity is sufficiently short to effect essentially single longitudinal mode generation of said radiation of a second-frequency.

15. The method claim 14 wherein said semiconductor light source consists of a laser diode array.

16. The method of claim 15 wherein said first and said second optical gain means both consist of neodymium-doped YAG and wherein said two different frequencies are about 1064 and about 1319 mm.

17. The method of claim 8 wherein said first and second optical cavities are both linear standing wave optical cavities.

18. The method of claim 17 wherein the longitudinal optical paths of said first and said second opitcal cavities are substantially colinear.

19. An apparatus for simultaneously generating laser radiation of two different frequencies which comprises:
   (a) optical pumping means for generating optical pumping radiation, wherein said optical pumping means comprises a semiconductor light source;
   (b) a first optical cavity for resonating laser radiation of a first frequency;
   (c) first optical gain means for receiving said optical pumping radiation which is disposed within said first optical cavity, wherein said first optical gain means is effective to transmit a portion of said optical pumping radiation and to absorb a portion of said optical pumping radiation, wherein said first optical gain means is effective to generate laser radiation of said first frequency in response to the absorbed portion of said optical pumping radiation, and wherein said first optical gain means consists of a solid lasant material;
   (d) a second optical cavity for resonating laser radiation of a second frequency; and
   (e) second optical gain means for receiving said transmitted portion of the optical pumping radiation which is disposed within said second optical cavity, wherein said second optical gain means is effective to generate laser radiation of said second frequency in response to the transmitted portion of said optical pumping radiation, and wherein said second optical gain means consists of a solid lasant material.

20. The apparatus of claim 19 wherein said first optical cavity defines a longitudinal optical path for said laser radiation of a first frequency which passes through said first optical gain means, and wherein said optical pumping radiation is delivered to said first optical gain means substantially along said longitudinal optical path of the first optical cavity.

21. The apparatus of claim 20 wherein said second optical cavity defines a longitudinal optical path for said laser radiation of a second frequency which passes through said second optical gain means, and wherein said transmitted portion of the optical pumping radiation is delivered to said second optical gain means substantially along said longitudinal optical path of the second optical cavity.

22. The apparatus of claim 21 which additionally comprises means for directing said optical pumping radiation into a volume of said first optical gain means which has a transverse cross-sectional area sufficiently small to effect essentially single transverse mode generation of said laser radiation of a first frequency within said first optical cavity.

23. The apparatus of claim 22 which additionally comprises means for directing said transmitted portion of the optical pumping radiation into a volume of said second optical gain means which has a transverse cross-sectional area sufficiently small to effect essentially single transverse mode generation of said laser radiation of a second frequency.

24. The apparatus of claim 23 wherein said longitudinal optical path of the first optical cavity is sufficiently short to effect essentially single longitudinal mode generation of said laser radiation of a first frequency within said first optical cavity.

25. The apparatus of claim 24 wherein said longitudinal optical path of the second optical cavity is sufficiently short to effect essentially single longitudinal mode generation of said laser radiation of a second frequency within said second optical cavity.

26. The apparatus of claim 25 wherein the longitudinal optical path length of both the first and the second optical cavity is in the range from about 0.1 to about 2 millimeters.

27. The apparatus of claim 25 wherein said semiconductor light source consists of a laser diode array.

28. The apparatus of claim 25 wherein said first and said second optical gain means both consist of neodymium-doped YAG.

* * * * *

UNITED STATES PATENT OFFICE
CERTIFICATE OF CORRECTION

Patent No. 4,956,843          Dated September 11, 1990

Inventor(s) Pedram Akhavan-Leilabady and Douglas W. Anthon

It is certified that error appears in the above-identified patent and that said Letters Patent is hereby corrected as shown below:

Column 5, line 9, "GaInP" should read --GaInP--.

Column 10, line 25, "The method claim 14" should read --The method of claim 14--.

Signed and Sealed this

Twelfth Day of May, 1992

Attest:

DOUGLAS B. COMER

Attesting Officer     Acting Commissioner of Patents and Trademarks